US006987986B2

(12) United States Patent
Boesen

(10) Patent No.: US 6,987,986 B2
(45) Date of Patent: Jan. 17, 2006

(54) CELLULAR TELEPHONE, PERSONAL DIGITAL ASSISTANT WITH DUAL LINES FOR SIMULTANEOUS USES

(76) Inventor: Peter V. Boesen, 1000 73rd St., Des Moines, IA (US) 50311

( * ) Notice: Subject to any disclaimer, the term of this patent is extended or adjusted under 35 U.S.C. 154(b) by 780 days.

(21) Appl. No.: 09/886,526

(22) Filed: Jun. 21, 2001

(65) Prior Publication Data

US 2002/0198021 A1 Dec. 26, 2002

(51) Int. Cl.
H04M 1/00 (2006.01)

(52) U.S. Cl. .................................... 455/556.1; 455/557
(58) Field of Classification Search ............. 455/552.1, 455/553.1, 556.1, 556.2, 557
See application file for complete search history.

(56) References Cited

U.S. PATENT DOCUMENTS

| 4,682,180 | A | | 7/1987 | Gans |
|---|---|---|---|---|
| 5,046,130 | A | * | 9/1991 | Hall et al. ..................... 455/78 |
| 5,422,934 | A | | 6/1995 | Massa |
| 5,758,294 | A | | 5/1998 | Ganesan et al. |
| 5,771,438 | A | | 6/1998 | Palermo et al. |
| 5,894,595 | A | | 4/1999 | Foladare et al. |
| 5,896,375 | A | * | 4/1999 | Dent et al. .................. 370/347 |
| 5,898,908 | A | | 4/1999 | Griffin et al. |
| 5,930,729 | A | | 7/1999 | Khamis et al. |
| 5,983,073 | A | | 11/1999 | Ditzik |
| 6,021,207 | A | | 2/2000 | Puthuff et al. |
| 6,094,492 | A | | 7/2000 | Boesen |
| 6,167,039 | A | | 12/2000 | Karlsson |
| 6,377,818 | B2 | * | 4/2002 | Irube et al. ............... 455/556.1 |
| 6,418,326 | B1 | * | 7/2002 | Heinonen et al. ........... 455/558 |
| 6,427,078 | B1 | * | 7/2002 | Wilska et al. ............. 455/550.1 |
| 6,516,201 | B2 | * | 2/2003 | Kanbara et al. ............. 455/551 |
| 6,633,759 | B1 | * | 10/2003 | Kobayashi ................. 455/419 |
| 6,658,254 | B1 | * | 12/2003 | Purdy et al. ................ 455/445 |
| 6,680,923 | B1 | | 1/2004 | Leon |
| 6,788,332 | B1 | * | 9/2004 | Cook ....................... 348/14.02 |

FOREIGN PATENT DOCUMENTS

| JP | 10163939 A2 | 6/1998 |
|---|---|---|
| JP | 2000022670 A | 1/2000 |

OTHER PUBLICATIONS

Article entitled, "5th International Conference on Wearable Computers," by Rick Johnson, Pen Computing Magazien, Aug. 2000.

Bell Labs, Wireless Research Laboratory, Internet pages printed on Jun. 26, 2000.

* cited by examiner

Primary Examiner—Bing Q. Bui
(74) Attorney, Agent, or Firm—McKees, Voorhees & Sease, P.L.C.

(57) ABSTRACT

The present invention includes a method and apparatus for a handheld personal communications device capable of simultaneous wireless voice communications service and wireless data communications service. The invention includes providing wireless voice communications service to a first line of a handheld personal communications device and simultaneously providing wireless data communications service to a second line of the handheld personal communications device.

12 Claims, 3 Drawing Sheets

CELLULAR TELEPHONE, PERSONAL DIGITAL ASSISTANT WITH DUAL LINES FOR SIMULTANEOUS USES

BACKGROUND OF THE INVENTION

The present invention relates to personal communications systems such as those that combine the functionality of a personal digital assistant with wireless voice communications, such as cellular phones or satellite phones.

Recently, numerous efforts and attempts have been made to combine cellular phones with personal digital assistants. Although the terms cellular phone and personal digital assistant are used throughout, it is to be understood that both terms should be construed broadly. Cellular phones include satellite phones and other technologies for providing wireless voice communications. PDA is used to refer to handheld computers which have become known as personal digital assistants, handheld devices with organizer functions, and similar type devices. For example, Smart phones, or other cellular phones that offer wireless web services are considered to have PDA functionality.

Numerous attempts have been made to combine wireless voice services with wireless data services such as wireless web access services. Advances in the field have provided for the creation of devices that contain the functionality of a PDA with wireless voice communications. Problems remain in such combinations.

Currently, such solutions that combine PDA functionality with cellular phones suffer from a number of problems that do not occur when separate devices are used. One of the greatest problems recognized by the Applicant is that these prior art solutions do not provide for wireless data services to be used simultaneously with wireless voice services. This is problematic, as an operator of the device may want to talk to someone over the wireless phone while simultaneously accessing wireless data services such as the web. Because a shared line is used, both the wireless voice services and the wireless data services are not simultaneously accessible.

Furthermore, this inability to simultaneously access wireless voice and wireless data services may negatively effect service providers in that only one such service is being used although a user may desire to use both services simultaneously. Therefore, problems in the art remain.

As a primary object, feature, or advantage of the present invention to provide an apparatus and method for a handheld personal communication device that improves upon the state of the art.

A further object, feature, or advantage of the present invention to provide a method and apparatus for a handheld personal communications device capable of simultaneous wireless voice communications and wireless data communications.

It is a further object, feature, or advantage of the present invention to provide a method and apparatus for a handheld personal communications device that permits service carriers to simultaneously generate wireless voice communications service charges and wireless data communications service charges.

A further object, feature, or advantage of the present invention to provide a method and apparatus for a handheld personal communications device that permits a user to talk on a cellular phone while simultaneously viewing the wireless web.

These and other objects, features, and advantages of the present invention are disclosed in the specification and claims.

BRIEF SUMMARY OF THE INVENTION

The invention is an apparatus and method that provides for a handheld wireless communications device capable of simultaneous wireless voice communications and wireless data communications. One aspect of the device provides for a device containing both cellular phone functionality and PDA functionality with dual lines. This provides for a user to simultaneously talk on a cellular phone while accessing data such as the web over a wireless data communication service.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The present invention will now be described as it applies to an exemplary embodiment. It is not intended that the present invention be limited to the described embodiment. It is intended that the invention cover all modifications and alternatives which may be included within the spirit and scope of the invention.

Figure 1:
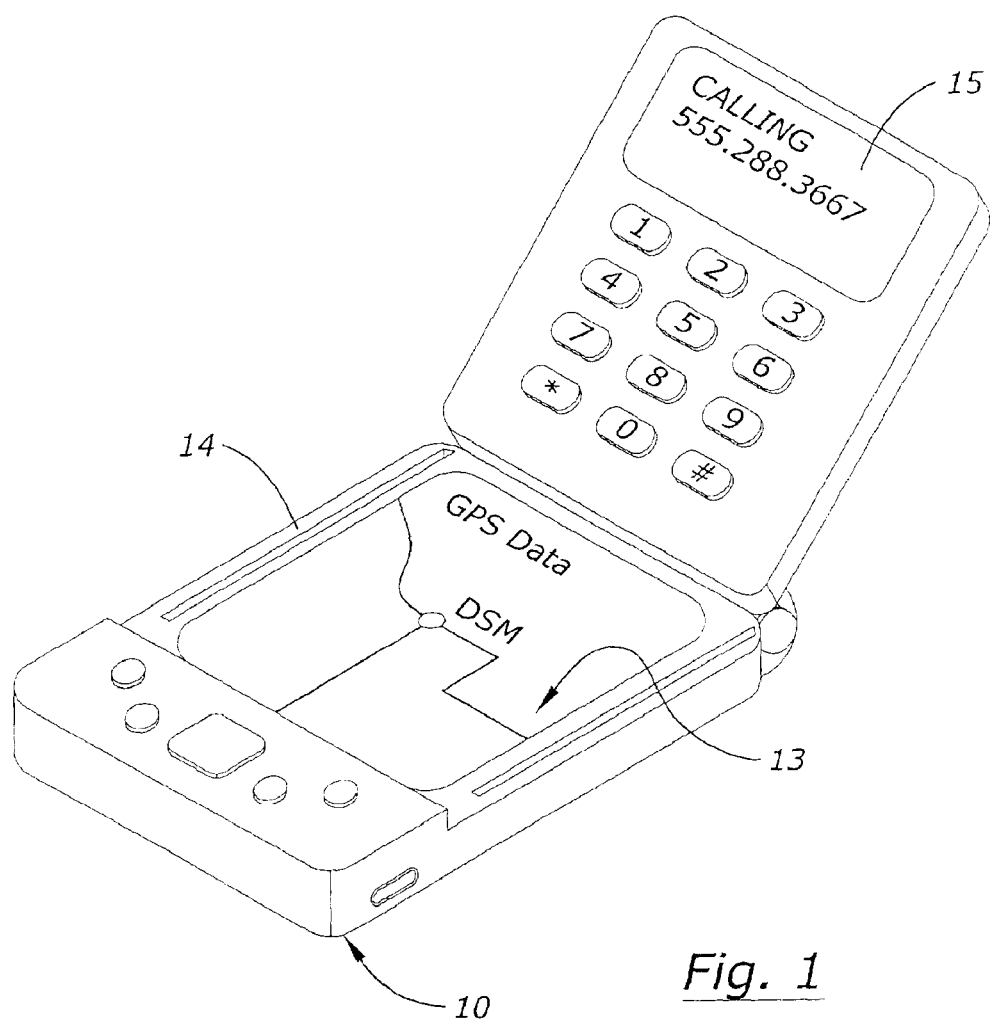
FIG. 1 is a diagram of a personal communications device of the present invention having dual lines.

The present invention provides for a handheld personal communications device and method that permit simultaneous wireless voice communications and wireless data communications. One such device of the present invention is shown in FIG. 1. In FIG. 1 a handheld device 10 is shown. The device 10 contains wireless voice and PDA functionality such as is typically found in a smart phone or in other combinations of PDA's and wireless voice communications. These types of functionalities are also included in PDA's with attachments that provide voice communications, or other types of devices providing the dual functionality. The present invention's device 10 differs from prior devices in the inclusion of dual line capability as is apparent from device 10 having two separate antennas. A first antenna 12 is used for a first line for voice communications while a second antenna 14 is used for wireless data communications. The first antenna 12 and the second antenna 14 shown are both internal the device 10. Placing the antennas on the interior of the device can improve the aesthetics of the device as well as reduce the awkwardness of the device. The present invention, however, contemplates that the first antenna 12 and/or the second antenna 14 may protrude from the device 10 as well. The invention further contemplates that a single antenna may be used instead of two separate antennas. The device 10 also includes a display 13. The display may be used for displaying a visual representation of data received over the data communications line. For example, the display 13 can display portions of the wireless web. In addition, a display 13 can contain other PDA information and may also include such things as a visual representation of a key pad that, when the display is a touch sensitive display, may be used to initiate a call.

Figure 3:
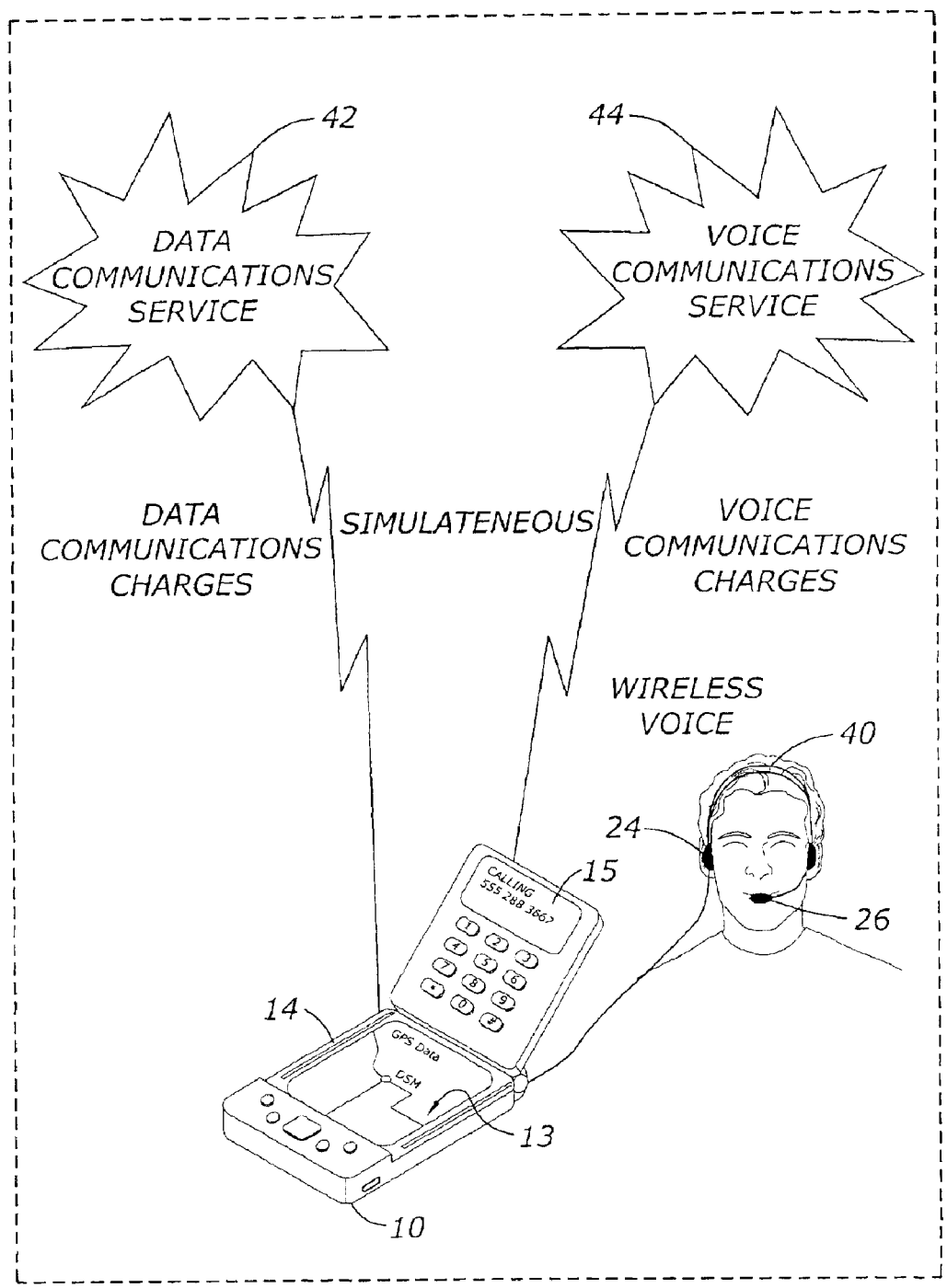
FIG. 3 is a diagram of a personal electronic device of the present invention as a part of a system whereby both data communication service charges and voice communication service charges may simultaneously accrue.

The present invention may also include an optional second display 15. The second display 15 may be used to display information generally associated with a phone or cellular phone. The optional second display 15 may be a multi-line display such as an LCD. One advantage of having the second display in the embodiment shown in FIG. 3 is that the second display may be viewable even when device 10 is in a closed position.

The personal communications device 10 also includes a sensor used to sense voice sound information. For example, the sensor can be an air conduction sensor such as a microphone used to transduce voice sound information. Alternatively, the sensor can be a bone conduction sensor, or other sensor used to transduce voice sound information for communication over the voice communications line.

In addition, the handheld device is in operative connection with a speaker capable of producing sound information.

Figure 2:
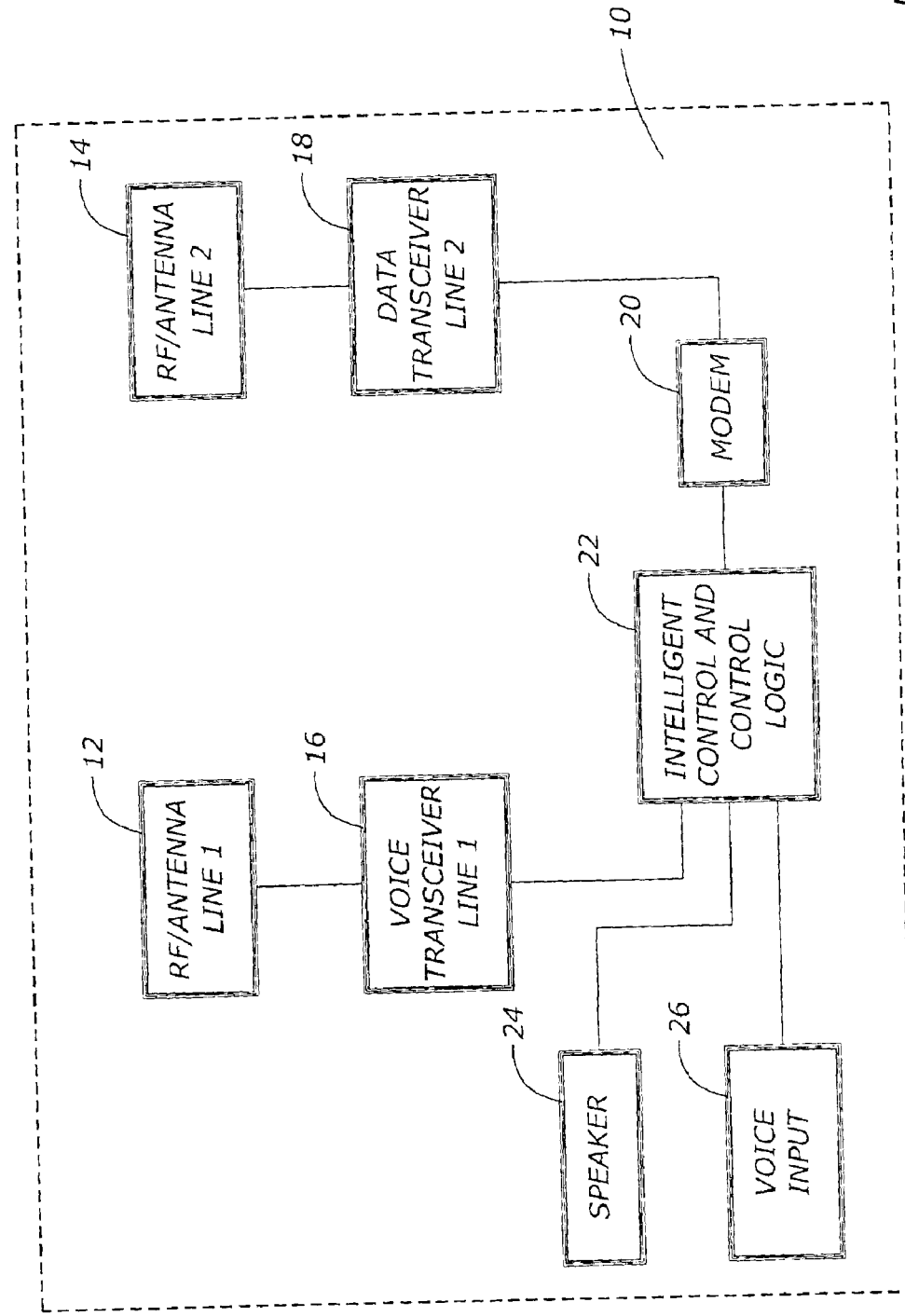
FIG. 2 is a block diagram of a handheld personal communications device of the present invention having dual lines.

FIG. 2 provides a block diagram of the handheld personal communications device of the present invention. In FIG. 2, the personal communications device has multiple lines. As shown, there is the first antenna 12 corresponding to a first line. The antenna 12 is electrically connected to a voice transceiver line one 16. The voice transceiver 16 is then electrically connected to an intelligent control 22. The intelligent control 22 may be a processor, a microprocessor, a microcontroller, a digital signal processor, an integrated circuit, a portion of an integrated circuit, a control circuit, or any of the above in combination with other control logic or other intelligent control. The present invention is in no way limited to the particular intelligent control 22 used.

In addition, a second antenna 14 is used for line two. A data communications signal is received through the antenna 14 and sent to the data transceiver for line two 18. The data transceiver is then electrically connected to a modem 20. The modem 20 may be optional, depending upon the type of communication channel and the functionality of the intelligent control 22. For example, the functionality of modem 20 can be incorporated into the intelligent control 22.

In this manner, a device is disclosed that is capable of receiving information simultaneously from both a wireless voice communication line as well as a wireless data communication line.

The present invention further contemplates that a single communication line can be used if that line can be broken into channels accordingly. For example, a digital line may be broken into one or more channels such as a voice channel and a data channel. The present invention contemplates that one or both channels may be digital. For example, voice over IP (VoP) applications may be used when a digital channel is used.

FIG. 3 illustrates a pictorial representation of the handheld personal communication device of the present invention in use. The handheld personal communication device 10 is shown. The device has a screen 13 such as may be used for visually representing text and images from the wireless web. In addition, the handheld personal communication device 10 has antennas 12 and 14. Although the diagram depicts the antennas being separately located, the present invention contemplates numerous locations of the antennas including exterior to the casing of the handheld device 10. In addition, a speaker 24 is operatively connected to the wireless communication device 10. Although an external speaker is shown, the present invention contemplates that the speaker may be built into the personal electronic device 10. In addition, a microphone 26 is shown operatively connected to the wireless communication device 10. Similarly, the present invention contemplates that the microphone 26 may be built into the personal electronic device 10. In addition, the personal electronic device 10 may include input and output ports for the microphone 26, and one or more speakers 24, respectively. As shown, the speaker 24 and microphone 26 are a part of the headset 40. The present invention contemplates that any type of headset or other type of hands free communication device may be used with the present invention.

As shown in FIG. 3, the personal electronic device 10 is providing simultaneous access to both data communications service 42 and voice communications service 44. This allows a user of the handheld personal communications device 10 to simultaneously talk over the voice communications line while simultaneously viewing wireless web or other data communication service through the data communication service 42. It is also apparent that when the user is simultaneously using the data communications service 42 and the voice communications service 44, the user can accrue both data communications charges as well as voice communications charges. This provides an advantage to wireless service providers, particularly those that provide both data communications service and voice communications service.

The service provider can provide wireless voice communications service to the first line of the handheld personal communications device while simultaneously providing wireless data communications service to the second line of the handheld personal communications device. The service provider can then charge for the voice communications service, as well as charge for the data communications service.

The present invention contemplates any number of wireless voice communications service and wireless data communications service. For example the wireless voice communications service can include PCS, CDPD, AMPS, GSM, as well as any number of other wireless voice communications services. Similarly, the present invention contemplates that any number of wireless data communications service may be provided. For example TCP/IP services may be provided as well as WAP services. The present invention is in no way limited to the particular protocol or type of voice communications service or data communications service used.

Thus, a method and device for a handheld personal communications device capable of simultaneous wireless voice communications and wireless data communications service has been disclosed. The present invention contemplates numerous variations in the types of voice communications service, the types of data communications service, the placement and use of antennas, the placement and use of sound sensors, the type of display, the type of intelligent control, the type of transceivers, and other variations such as may be known or become known in the art.

What is claimed is:

1. A handheld personal communications device capable of simultaneous wireless voice communications and wireless data communications comprising a housing:

a first wireless radio transceiver disposed within the housing for operative voice communication across a first communications channel;

a second wireless radio transceiver disposed within the housing for operative data communication across a second communications channel;

a sensor operatively connected to the first wireless radio transceiver for transducing voice sound information;

a speaker operatively connected to the first wireless radio transceiver for producing voice sound information;

an intelligent control operatively connected to the second wireless radio transceiver for sending and receiving data; and a display operatively connected to the processor capable of displaying a visual representation of data received over the second wireless transceiver;

wherein the second communication channel provides for receipt of wireless data to provide wireless web access.

2. The handheld personal communications device of claim 1 further comprising a first antenna electrically connected to the first wireless radio transceiver.

3. The handheld personal communications device of claim 2 further comprising a second antenna electrically connected to the second wireless transceiver.

4. The handheld personal communications device of claim 1 wherein the data is GPS data.

5. A method for providing wireless voice communication service and wireless data communications service to a handheld personal communication device comprising:

providing wireless voice communications service to a first line of the handheld personal communications device;

simultaneously providing wireless data communications service to a second line of the handheld personal communications device;

charging for the voice communications service; and charging for the data communications service.

6. The method of claim 5 wherein the wireless voice communications service is selected from the set comprising PCS, CDPD, AMPS, and GSM.

7. The method of claim 5 wherein the wireless data communications service is selected from the set comprising TCP/IP and WAP.

8. The method of claim 5 wherein the first line is provided by a first wireless transceiver and the second line is provided by a second wireless transceiver.

9. The method of claim 5 wherein the first line is provided by a first channel and the second line is provided by a second channel.

10. A handheld personal communications device capable of simultaneous communication across a first communication channel associated with a first antenna and a second communications channel associated with a second antenna, comprising:

a housing;

the first antenna operatively connected to a radio transceiver disposed within the housing for operative voice communication across the first communications channel;

the second antenna for receiving GPS data over the second communications channel;

an intelligent control operatively connected to the radio transceiver arid adapted to receive the GPS data; and a display operatively connected to the intelligent control.

11. A handheld personal electronic device providing simultaneous access for data communications and voice communication to allow a user to simultaneously talk over a voice communication channel while viewing data communicated via the data communications service comprising:

a housing;

a first communication means disposed within the housing for receiving voice communication across a first communications channel;

a second communication means disposed within the housing for receiving data communication across the second communications channel;

an intelligent control operatively connected to the first communication means and the second communication means and disposed within the housing;

a display operatively connected to the intelligent control;

wherein the first communication means and the second communication means are adapted for simultaneous communication.

12. The handheld personal electronic device of claim 11 wherein the data is GPS data.

* * * * *